(12) United States Patent
Ha (10) Patent No.: US 11,586,784 B2
(45) Date of Patent: Feb. 21, 2023

(54) METHOD AND SYSTEM FOR AUGMENTED REALITY CONTENT PRODUCTION BASED ON ATTRIBUTE INFORMATION APPLICATION

(71) Applicant: VIRNECT inc., Seoul (KR)

(72) Inventor: Tae Jin Ha, Gimpo-si (KR)

(73) Assignee: VIRNECT INC., Seoul (KR)

( * ) Notice: Subject to any disclaimer, the term of this patent is extended or adjusted under 35 U.S.C. 154(b) by 0 days.

(21) Appl. No.: 17/564,134

(22) Filed: Dec. 28, 2021

(65) Prior Publication Data

US 2022/0207199 A1 Jun. 30, 2022

(30) Foreign Application Priority Data

Dec. 29, 2020 (KR) ........................ 10-2020-0186292

(51) Int. Cl.
| | | |
|---|---|---|
| G06T 19/00 | (2011.01) | |
| G06F 3/042 | (2006.01) | |
| G06F 30/12 | (2020.01) | |
| G06T 19/20 | (2011.01) | |
| G06F 111/18 | (2020.01) | |

(Continued)

(52) U.S. Cl.
CPC ............ G06F 30/12 (2020.01); G06F 3/0425 (2013.01); G06T 19/006 (2013.01); G06T 19/20 (2013.01); *G06F 2111/16* (2020.01); *G06F 2111/18* (2020.01); *G06F 2111/20* (2020.01); *G06T 2215/16* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS 10,403,047 B1 * 9/2019 Comer ................ H04L 12/1827
2012/0249741 A1 * 10/2012 Maciocci .............. G06T 19/006
348/51

FOREIGN PATENT DOCUMENTS

| EP | 2887322 A1 | 6/2015 |
|---|---|---|
| KR | 20150034864 A | 4/2015 |
| KR | 20170018930 A | 2/2017 |

(Continued)

*Primary Examiner* — Joni Hsu
(74) *Attorney, Agent, or Firm* — STIP Law Group, LLC (57) ABSTRACT

A method for augmented reality content production based on attribute information application according to an embodiment of the present disclosure, as a method for augmented reality content production based on attribute information application by a production application executed by at least one or more processors of a computing device, comprises providing a virtual object authoring space which is a virtual space for authoring a virtual object and includes at least one or more reference objects; providing a virtual object authoring interface for the virtual object authoring space; generating augmentation relationship attribute information based on a virtual object generated based on the provided virtual object authoring interface and at least one reference object of the virtual object authoring space; storing the virtual object by including the generated augmentation relationship attribute information; and displaying the stored virtual object on a reference object in a different space other than the virtual object authoring space based on the augmentation relationship attribute information.

11 Claims, 7 Drawing Sheets

(51) Int. Cl.
*G06F 111/20* (2020.01)
*G06F 111/16* (2020.01)

(56) References Cited

FOREIGN PATENT DOCUMENTS

| KR | 20200001237 A | 1/2020 |
|----|---------------|--------|
| KR | 20200029998 A | 3/2020 |

* cited by examiner

METHOD AND SYSTEM FOR AUGMENTED REALITY CONTENT PRODUCTION BASED ON ATTRIBUTE INFORMATION APPLICATION

CROSS-REFERENCE TO RELATED APPLICATIONS

This application claims the priority of the Korean Patent Applications NO 10-2020-0186292 filed on Dec. 29, 2020, in the Korean Intellectual Property Office, the disclosure of which is incorporated herein by reference.

BACKGROUND OF THE DISCLOSURE

Field of the Disclosure

The present disclosure relates to a method and a system for augmented reality (AR) content production based on attribute information application. More particularly, the present disclosure relates to a method and a system for AR content creation based on attribute information application, which, when AR content created in one virtual space is displayed on another virtual space, displays the AR content based on the attribute information matching the AR content.

Related Art

Recently, with the breakthroughs in image information devices, virtual reality (VR) and augmented reality (AR) technologies are actively researched and developed and are being utilized in various fields.

For example, virtual reality and augmented reality technologies are being put into practical use in the fields such as broadcasting, advertisement, exhibition, game, theme park, defense, education, and promotion.

Along with technological development, a number of virtual reality and augmented reality applications based on various computing devices are also being developed.

Also, as various computing devices (for example, mobile devices and/or desktop devices) are in wide use, an environment in which ordinary users may easily access and use virtual and augmented reality applications is being created.

For example, an application provides software tools capable of creating virtual objects in shapes desired by a user in a predetermined virtual space.

A plurality of users using the applications create virtual objects using a library that loads predetermined virtual objects or often access open-source data sets to load and use virtual objects pre-created by other users. The environment built upon the open-source data sets is gradually expanding and evolving.

However, when a user retrieves a predetermined virtual object into the user's dedicated virtual space using an open-source data set, it is frequently observed that the virtual object is augmented and displayed in a somewhat unnatural shape.

For example, when a first virtual object created in a user's first virtual space is loaded into a second virtual space of another user, the first virtual object is frequently not displayed adequately such that the first virtual object is loaded at a location out of the second virtual space or overlaps another augmented reality content.

In addition to these problems, users' demands for various additional services using virtual reality and augmented reality technologies are becoming more specific and diversified; thus, the development and introduction of related technologies are necessary.

PRIOR ART REFERENCES

Patents (Patent 1) KR 10-2020-0001237 A

SUMMARY

The present disclosure has been made to solve the problem above and intends to provide a method and a system for augmented reality content production based on attribute information application, which, when AR content created in one virtual space is displayed on another virtual space, displays the AR content based on the attribute information.

Technical objects to be achieved by the present disclosure and embodiments according to the present disclosure are not limited to the technical objects described above, and other technical objects may also be addressed.

A method for augmented reality content production based on attribute information application according to an embodiment of the present disclosure, as a method for augmented reality content production based on attribute information application performed by a production application executed by at least one or more processors of a computing device, comprises providing a virtual object authoring space which is a virtual space for authoring a virtual object and includes at least one or more reference objects; providing a virtual object authoring interface for the virtual object authoring space; generating augmentation relationship attribute information based on a virtual object generated based on the provided virtual object authoring interface and at least one reference object of the virtual object authoring space; storing the virtual object by including the generated augmentation relationship attribute information; and displaying the stored virtual object on a reference object in a different space other than the virtual object authoring space based on the augmentation relationship attribute information.

At this time, the providing a virtual object authoring space includes generating the virtual object authoring space by detecting the 3D space for a user's surrounding environment based on at least one or more sensors.

Also, a method for augmented reality content production based on attribute information application according to an embodiment of the present disclosure further includes configuring a reference object within the generated virtual object authoring space, wherein the configuring a reference object includes detecting an object classified as a preconfigured reference object category among at least one or more objects within the virtual object authoring space and setting the detected object as a reference object.

Also, the providing a virtual object authoring interface includes configuring attribute information for the virtual object, and the attribute information includes at least one or more of position information, pose information, scale information, and shape information for the virtual object.

At this time, the augmentation relationship attribute information means the attribute parameter information required for augmenting the virtual object based on the reference object.

Also, the generating augmentation relationship attribute information includes at least one or more of generating position relationship parameter information representing position information of the virtual object based on the position information of the reference object, generating pose relationship parameter information representing pose information of the virtual object based on the pose information of the reference object, generating scale relationship parameter information representing scale information of the virtual object based on the scale information of the reference object, and generating contact surface area information for the reference object and the virtual object.

Also, the displaying the virtual object on a reference object of the different space includes detecting a main reference object corresponding to the reference object within the different space.

Also, the displaying on the different space further includes augmenting and displaying the virtual object on the different space with respect to the detected main reference object based on the augmentation relationship attribute information.

Meanwhile, a system for augmented reality content production based on attribute information application according to an embodiment of the present disclosure comprises at least one or more processors; and at least one or more memories, wherein the at least one application, as at least one application that creates augmented reality content based on attribute information application stored in the memory and executed by the at least one or more processors, provides a virtual object authoring space which is a virtual space for authoring a virtual object; configures a reference object within the provided virtual object authoring space; provides a virtual object authoring interface for the virtual object authoring space; generates augmentation relationship attribute information based on a virtual object generated based on the virtual object authoring interface and the reference object; stores the virtual object by including the generated augmentation relationship attribute information; and displays the stored virtual object on a reference object in a different space based on the augmentation relationship attribute information.

At this time, the application generates the augmented reality attribute information by generating at least two or more pieces of information among position relationship parameter information representing position information of the virtual object based on the position information of the reference object, pose relationship parameter information representing pose information of the virtual object based on the pose information of the reference object, scale relationship parameter information representing scale information of the virtual object based on the scale information of the reference object, and contact surface area information for the reference object and the virtual object.

When augmented reality content created in one virtual space is displayed on a different virtual space, a method and a system for augmented reality content production based on attribute information application according to an embodiment of the present disclosure displays the augmented reality content based on the attribute information of the augmented reality content and thus, provides an effect of minimizing an augmentation error or a sense of heterogeneity due to a relative attribute difference between the virtual environments even when the corresponding augmented reality content is displayed on another virtual environment different from the virtual environment in which the augmented reality content has been created.

The technical effects of the present disclosure are not limited to the technical effects described above, and other technical effects not mentioned herein may be understood clearly from the description below.

DESCRIPTION OF EXEMPLARY EMBODIMENTS

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, terms such as first and second are introduced to distinguish one element from the others, and thus the technical scope of the present disclosure should not be limited by those terms. Also, a singular expression should be understood to indicate a plural expression unless otherwise explicitly stated. The term include or have is used to indicate existence of an embodied feature or constituting element in the present disclosure; and should not be understood to preclude the possibility of adding one or more other features or constituting elements. Also, constituting elements in a figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, embodiments of the present disclosure will be described in detail with reference to appended drawings. Throughout the disclosure, the same or corresponding constituting element is assigned the same reference number, and repeated descriptions thereof will be omitted.

Figure 1:
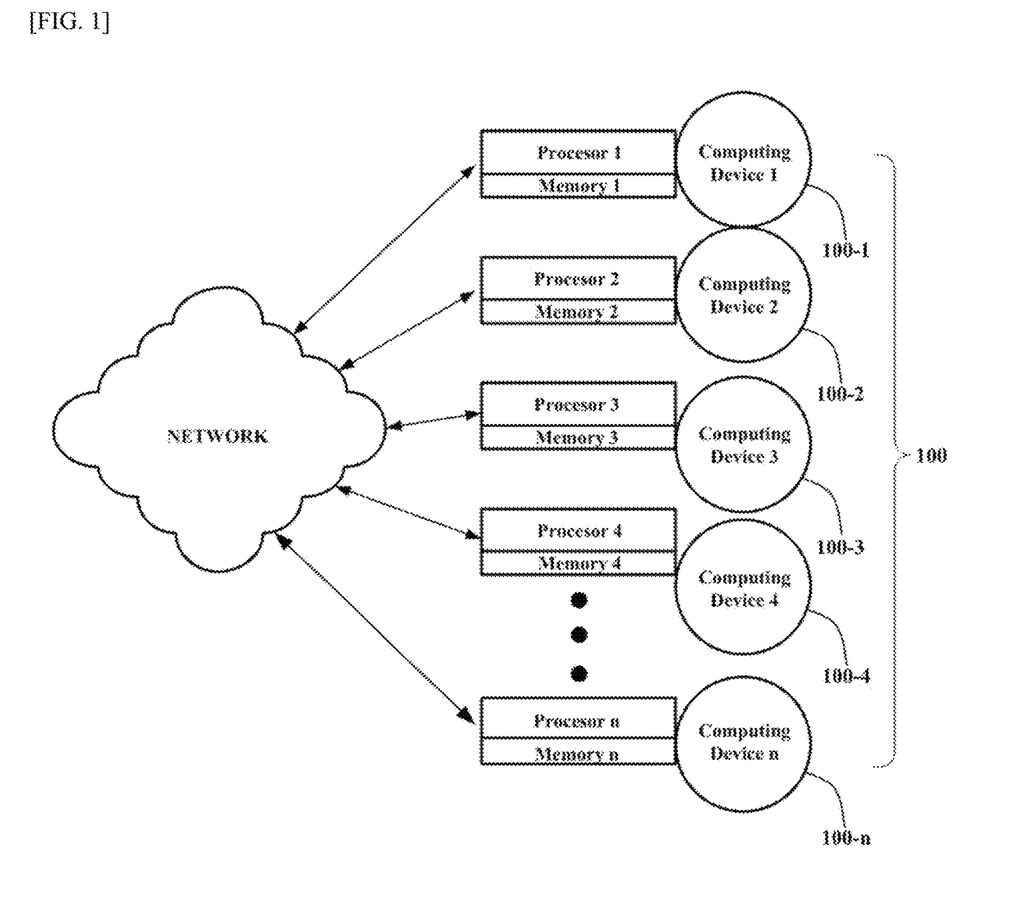
FIG. 1 illustrates a system for augmented reality content production based on attribute information application according to an embodiment of the present disclosure.

FIG. 1 illustrates a system for augmented reality content production based on attribute information application according to an embodiment of the present disclosure.

Referring to FIG. 1, a system for augmented reality content production based on attribute information application according to an embodiment (in what follows, content production system) may provide an augmented reality content production service (in what follows, content production service) based on attribute information application, which, when augmented reality content created in one virtual space (in the embodiment, a virtual object) is displayed on a different virtual space, displays the augmented reality content based on the attribute information (in the embodiment, position, pose, scale, shape, and/or contact surface information) of the augmented reality content.

The content production system providing a content production service according to the embodiment of the present disclosure may be implemented using at least one computing device 100-1, 100-2, 100-3, 100-4, . . . , 100-n: 100.

At this time, the at least one or more computing devices 100 may be connected to each other through a network.

Here, the network refers to a connection structure that exchanges information between individual nodes such as the at least one or more computing devices 100. Examples of such a network include a 3rd Generation Partnership Project (3GPP) network, a Long Term Evolution (LTE) network, a World Interoperability for Microwave Access (WIMAX) network, the Internet, a Local Area Network (LAN), a Wireless Local Area Network (Wireless LAN), a Wide Area Network (WAN), a Personal Area Network (PAN), a Bluetooth network, a satellite broadcasting network, an analog broadcasting network, and a Digital Multimedia Broadcasting (DMB) network but are not limited to the examples.

In what follows, the computing device 100 implementing the content production system will be described in detail with reference to appended drawings.

Computing Device: 100

The computing device 100 according to the embodiment of the present disclosure may be a predetermined computing device installed with a production application that provides a content production service.

Specifically, from a hardware point of view, the computing device 100 may include a mobile-type computing device, a desktop-type computing device, and/or a tabletop-type computing device installed with a production application.

Here, the mobile-type computing device may be a mobile device such as a smartphone or a tablet PC installed with the production application.

For example, the mobile-type computing device may include a smartphone, a mobile phone, a digital broadcast terminal, a personal digital assistant (PDA), a portable multimedia player (PMP), and a tablet PC.

Also, the desktop-type computing device may include a device installed with a program for executing a content production service based on wired/wireless communication, such as a personal computer like a fixed-type desktop PC, a laptop computer, and an ultrabook installed with a production application.

Also, the tabletop-type computing device according to the embodiment may be implemented in a tabletop form with a new shape and structure different from existing desktop-type computing devices, which, in this case, may provide an extended reality environment through a system included in the tabletop computing device.

Specifically, the tabletop-type computing device according to the embodiment may be a device that allows a user to easily check an image received from the computing device 100 of another remote user and provides an interface system through which the user may easily input augmented reality content (for example, a work guidance virtual object) for an object displayed on the corresponding image.

The tabletop-type computing device according to the embodiment may be a system for generating and providing a virtual/augmented/mixed reality image, which displays a virtual object generated based on an actual object of the image obtained at a current location on the image obtained from the computing device 100 of another user.

Meanwhile, from a functional point of view, the computing device may include at least one or more processors for data processing and at least one or more memories that store various application programs, data, and/or commands for providing a content production service.

Here, the memory may store at least one or more of an operating system (OS), various application programs, data, and commands for providing a content production service.

Also, the memory may include a program area and a data area.

Here, the program area according to the embodiment may be linked between an operating system (OS) for booting the computing device 100 and functional elements. The data area may store data generated according to the use of the computing device 100.

The memory according to the embodiment may be one of various storage devices, such as a ROM, a RAM, an EPROM, a flash drive, and a hard drive, or web storage that performs a storage function of the memory on the Internet. Also, the memory may be a recording medium detachable from the computing device 100.

Meanwhile, the processor may control the overall operation of each unit to implement a content production service.

The processor may be a system-on-a-chip (SOC) suitable for a computing device including a central processing unit (CPU) and/or a graphics processing unit (GPU), execute an operating system (OS) stored in the memory and/or an application program, and control each constituting element installed in the computing device 100.

Also, the processor may communicate internally with each constituting element through a system bus and may include one or more predetermined bus structures including a local bus.

Also, the processor may be implemented using at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and electrical units for performing other functions.

On the other hand, the computing device 100 according to the embodiment may include a producer terminal 101, which is the computing device 100 of a producer who creates augmented reality content (in the embodiment, a virtual object) and a display terminal 102, which is the computing device 100 of a user who loads and uses the augmented reality content.

At this time, the producer terminal 101 and the display terminal 102 are so called to distinguish the subjects who use the terminals, and the functional features performed by the computing devices 100 may be the same with each other.

Method for Augmented Reality Content Production Based on Attribute Information Application In what follows, a method for augmented reality content production based on attribute information application performed by a production application executed by at least one or more processors of the computing device 100 will be described in detail with reference to FIGS. 2 to 7.

At least one or more processors of the computing device 100 according to the embodiment of the present disclosure may execute at least one or more production applications stored in at least one or more memories or run the applications in the background.

Figure 2:
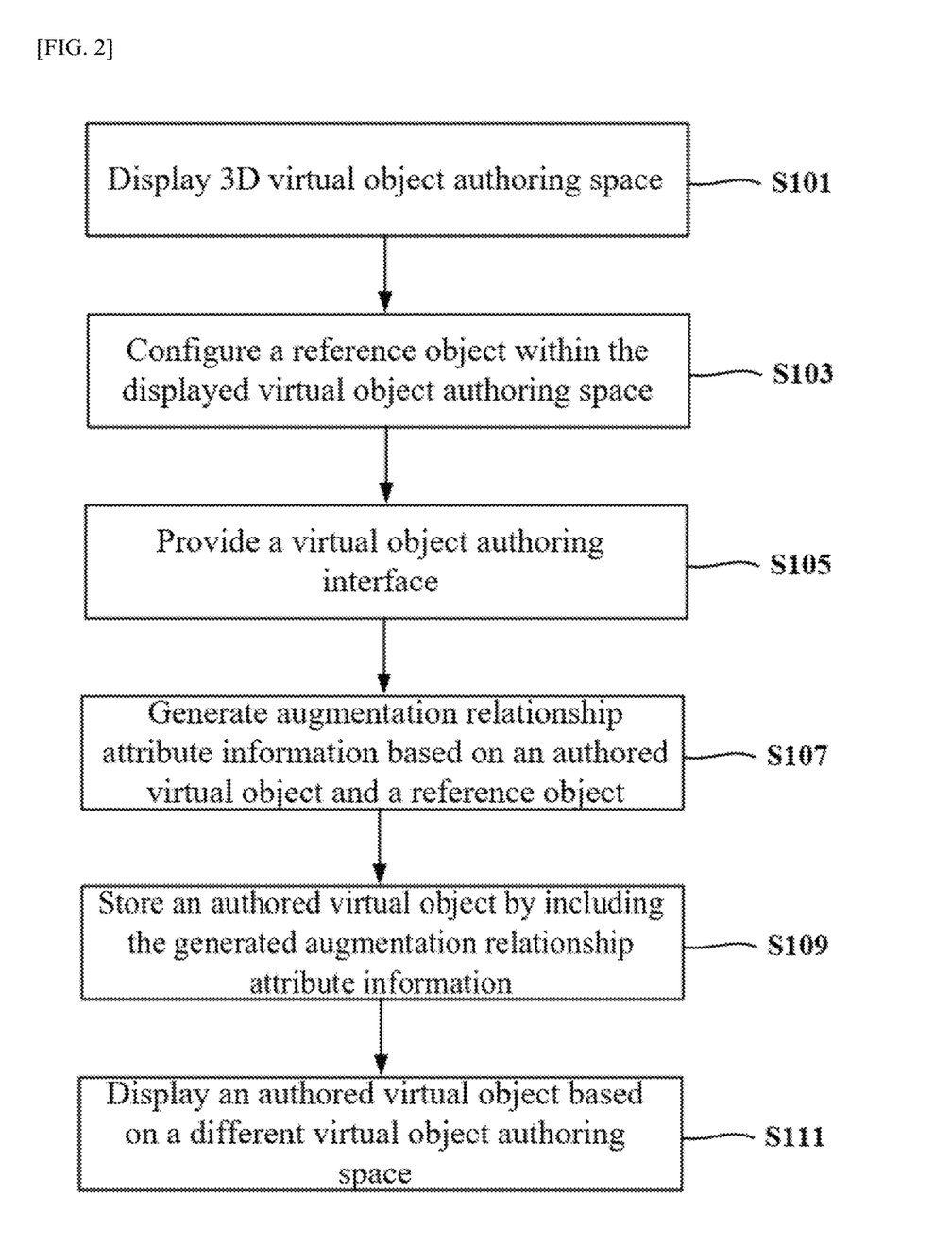
FIG. 2 is a flow diagram illustrating a method for augmented reality content production based on attribute information application according to an embodiment of the present disclosure.

FIG. 2 is a flow diagram illustrating a method for augmented reality content production based on attribute information application according to an embodiment of the present disclosure.

Referring to FIG. 2, the production application executed by at least one or more processors of the computing device 100 or run in the background according to the embodiment may display a 3D virtual object authoring space S101.

Figure 3:
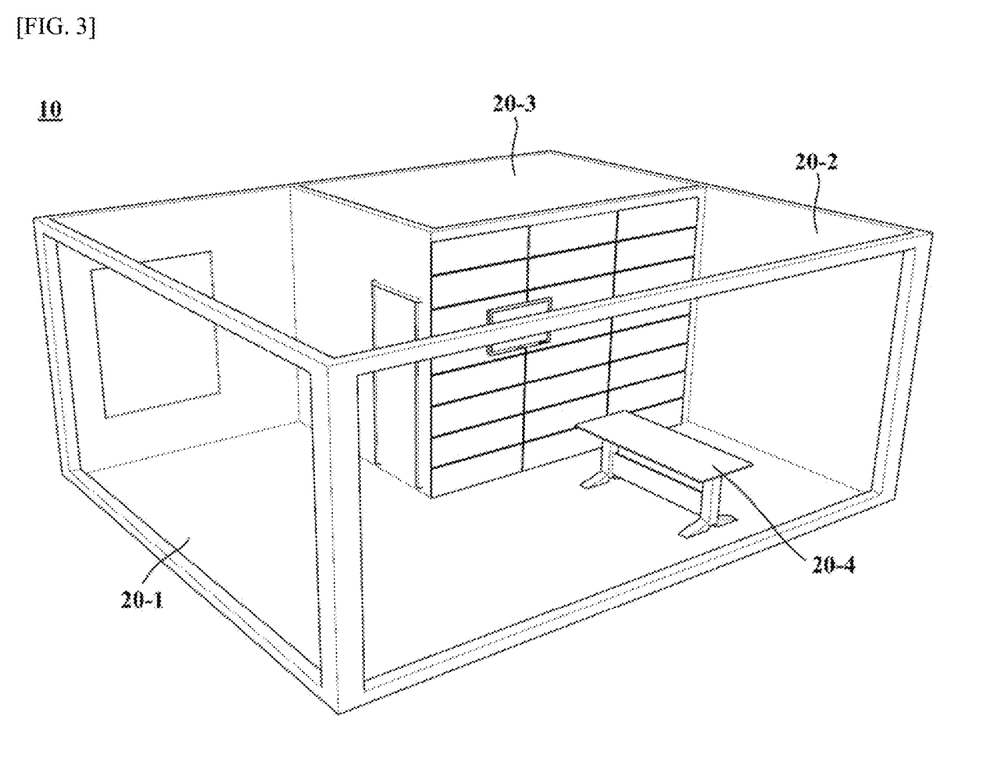
FIG. 3 is one example illustrating a virtual object authoring space according to an embodiment of the present disclosure.

FIG. 3 is one example illustrating a virtual object authoring space according to an embodiment of the present disclosure.

Here, referring to FIG. 3, the virtual object authoring space 10 according to the embodiment may be a virtual space in which a virtual object authoring process may be proceeded according to a request of a user (here, a producer).

Specifically, the production application according to the embodiment may generate and display the virtual object authoring space 10 by detecting the actual 3D space of a surrounding environment of a producer who creates a virtual object based on at least one or more sensors (for example, an image sensor and/or a depth sensor).

The production application according to another embodiment may provide the virtual object authoring space 10 based on a virtual space provided based on predetermined virtual object authoring software or tool.

Also, the production application according to the embodiment may configure a reference object 20 within the displayed virtual object authoring space 10 S103.

Here, the reference object 20 according to the embodiment may refer to an object used as a reference when a virtual object created in a first virtual object authoring space 10 is augmented in a second virtual object authoring space 10.

Specifically, in the case of a virtual object authoring space 10 generated by detecting the actual 3D space of a producer's surrounding environment based on at least one or more sensors (for example, an image sensor and/or a depth sensor), the production application according to the embodiment may detect an actual object belonging to a preconfigured category (namely, a category to which a preconfigured reference object belongs) among at least one or more actual objects within the corresponding virtual object authoring space 10.

And the production application may configure the reference object 20 within the corresponding virtual object authoring space 10 based on the detected actual object.

For example, when a preconfigured category is 'floor, sidewall, ceiling, table' category, the production application may detect a 'floor object 20-1, a sidewall object 20-2, a ceiling object 20-3, and a table object 20-4' among a plurality of actual objects within the virtual object authoring space 10.

And, in the example, the production application may set the detected actual object as a reference object 20.

In the case of a virtual object authoring space 10 based on predetermined virtual object authoring software or tool, the production application according to another embodiment may provide the virtual object authoring space 10 by setting a virtual object belonging to a preconfigured category as a default setting value of the virtual space.

For example, when a preconfigured category is 'floor, sidewall, ceiling, table' category, the production application may provide a virtual object authoring space 10 in which the 'floor virtual object, sidewall virtual object, ceiling virtual object, and table virtual object,' which are virtual objects belonging to the preconfigured category, are set on the virtual space by default.

As described above, the production application designates a predetermined object within a virtual space for authoring a virtual object (in the embodiment, the virtual object authoring space 10) as a reference object 20. Therefore, when a virtual object created in the corresponding virtual space is augmented later in another virtual space, the production application may display the virtual object at a more accurate position, pose, and shape based on the attribute relationship with the reference object 20 matched to the virtual object.

Figure 4:
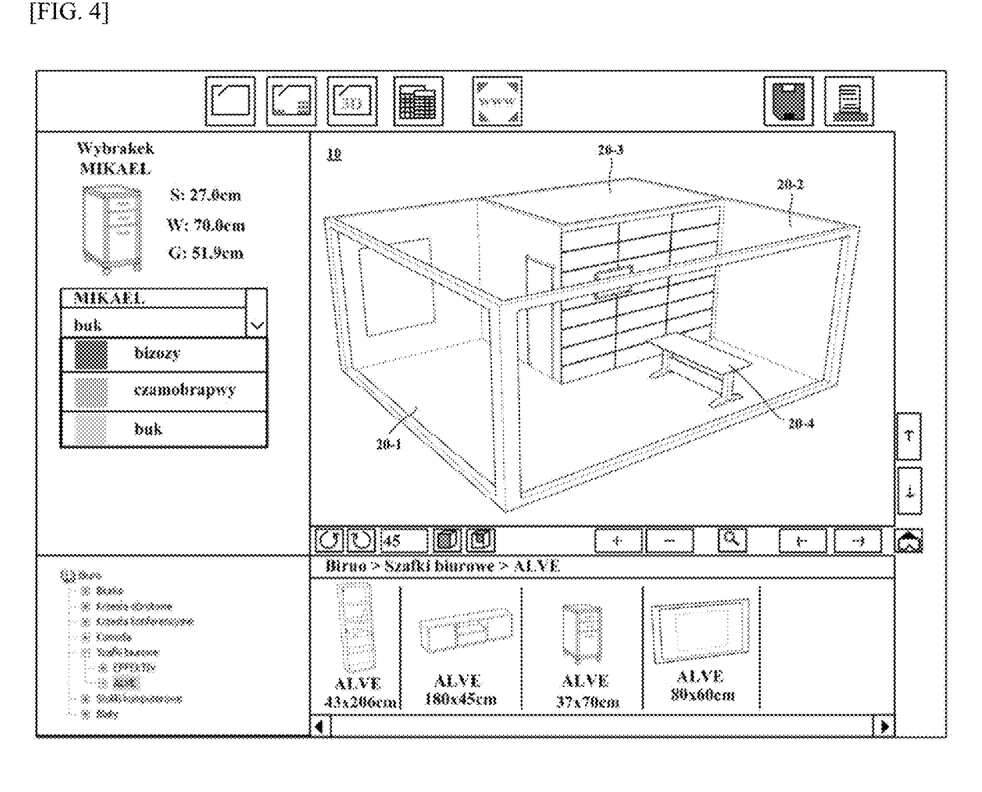
FIG. 4 is one example of a virtual object authoring interface according to an embodiment of the present disclosure.

Also, the production application according to the embodiment may provide a virtual object authoring interface based on the virtual object authoring space 10 S105.

FIG. 4 is one example of a virtual object authoring interface according to an embodiment of the present disclosure.

Referring to FIG. 4, the virtual object authoring interface according to the embodiment may be a user interface through which a user may author a predetermined virtual object on the virtual object authoring space 10.

Specifically, the production application according to the embodiment may generate and display a predetermined virtual object based on the input of a user (namely, a producer) based on the virtual object authoring interface.

The production application according to the embodiment may generate a predetermined virtual object based on a drawing input based on the virtual object authoring interface.

Alternatively, the production application according to the embodiment may load and generate a predetermined virtual object from a predetermined virtual object library (for example, Poly) based on the virtual object authoring interface.

Alternatively, the production application according to the embodiment may augment and display a virtual object generated as described above on the virtual object authoring space 10.

Alternatively, the production application according to the embodiment may set attribute information on a virtual object generated based on the virtual object authoring interface.

Here, attribute information according to the embodiment may include position information, pose information (6 degrees of freedom and/or viewpoint information), scale information, shape information, and/or contact surface area information of a generated virtual object.

Specifically, the production application according to the embodiment may perform a functional operation such as moving, tilting, rotation, scaling, and/or coloring operation on a virtual object based on a user input based on the virtual object authoring interface.

And the production application may set the attribute information on the corresponding virtual object based on the functional operation performed as described above.

Figure 5:
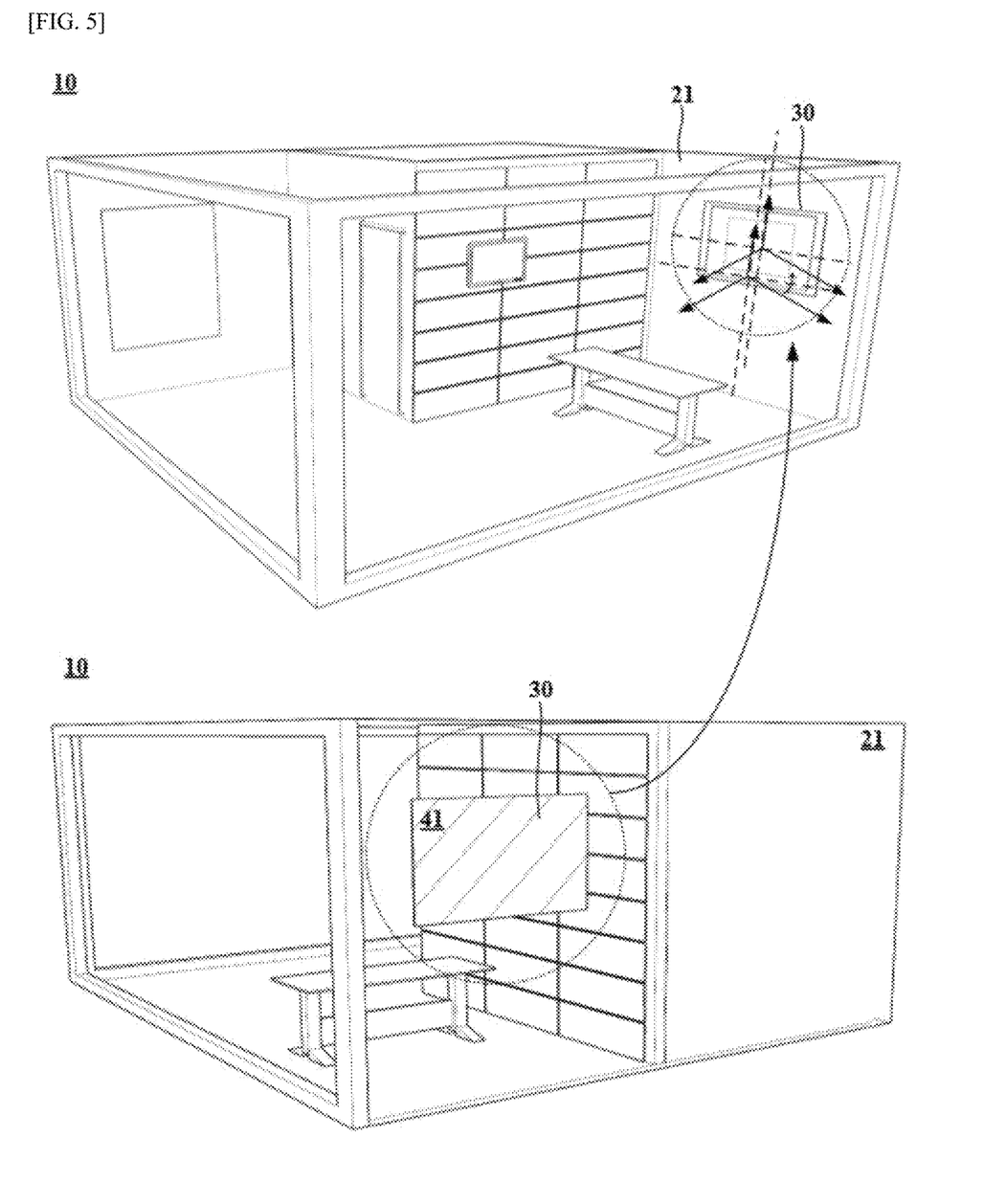
FIGS. 5 and 6 are one example illustrating augmentation relationship attribute information according to an embodiment of the present disclosure.
Figure 6:
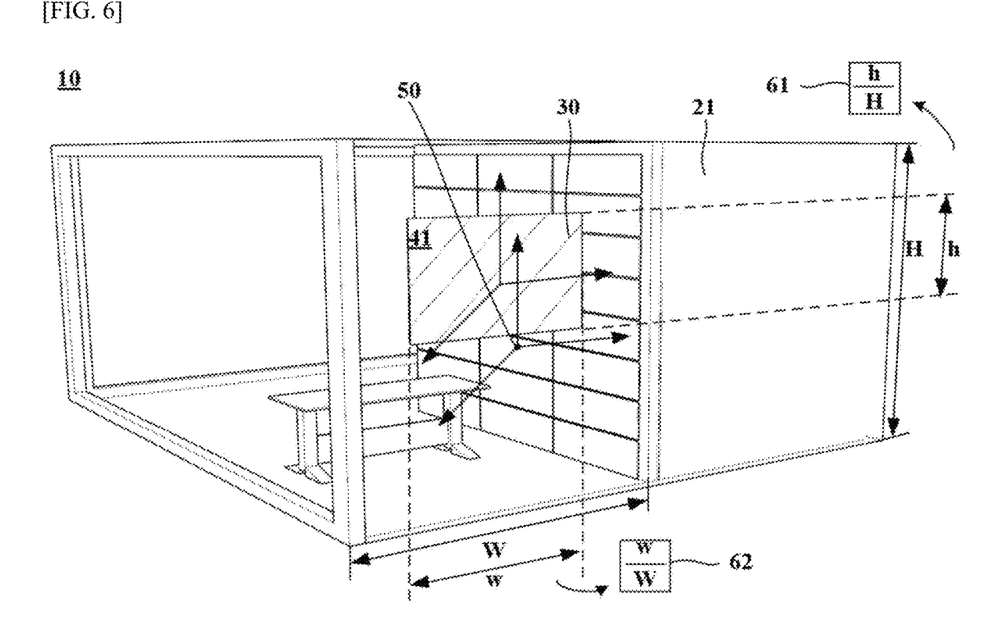

Also, the production application according to the embodiment may generate augmentation relationship attribute information based on the virtual object authored based on the virtual object authoring interface and the reference object 20 set as described above S107.

FIGS. 5 and 6 are one example illustrating augmentation relationship attribute information according to an embodiment of the present disclosure.

Referring to FIGS. 5 and 6, the augmentation relationship attribute information according to the embodiment may refer to the attribute parameter information required for augmenting a virtual object based on a reference object 20.

The augmentation relationship attribute information according to the embodiment may include position relationship parameter information representing position information of the virtual object based on the position information of the reference object 20, pose relationship parameter information representing pose information of the virtual object based on the pose information of the reference object 20, scale relationship parameter information representing scale information of the virtual object based on the scale information of the reference object 20, and/or contact surface area information representing area information, position information, and/or coordinate information of the contact surface area 41 where the reference object 20 and the virtual object make contact with each other.

Specifically, the production application according to the embodiment may select a first reference object 21, a reference object 20 to set augmentation relationship attribute information with respect to a virtual object, among at least one or more reference objects 20 within the virtual object authoring space 10.

Specifically, the production application may provide a user interface for selecting the reference object 20 to set the augmented relationship attribute information.

Also, the production application may select the first reference object 21 based on user input through the provided user interface.

Also, when the first reference object 21 is selected as described above, the production application according to the embodiment may determine attribute information of the first virtual object 30 to set augmentation relationship attribute information with respect to the first reference object 21 based on the virtual object authoring interface.

At this time, the production application according to the embodiment may modify the attribute information of the first virtual object 30 based on the virtual object authoring interface or maintain the attribute information.

Also, the production application according to the embodiment may generate augmentation relationship attribute information based on the first reference object 21 and the first virtual object 30 by referring to the attribute information determined with respect to the first virtual object 30 and the attribute information of the first reference object 21.

For example, referring further to FIG. 6, the production application may generate position relationship parameter information representing a relative position of the first virtual object 30 with respect to the first reference object 21 based on the attribute information determined with respect to the first virtual object 30 and the attribute information of the first reference object 21.

For example, based on the coordinate information 50 for the first side surface of the first reference object 21, the production application may generate the position relationship parameter information by determining the height ratio information 61 and/or width ratio information 62 of the first virtual object 30 on the first side surface.

In another example, the production application may generate pose relationship parameter information representing a relative pose of the first virtual object 30 with respect to the first reference object 21 based on the attribute information determined with respect to the first virtual object 30 and the attribute information of the first reference object 21.

For example, the production application may generate pose relationship parameter information by calculating a difference value between the 6 degrees of freedom information of the first reference object 21 and the 6 degrees of freedom information of the first virtual object 30.

Meanwhile, the production application according to another embodiment may automatically set the augmentation relationship attribute information with respect to the first virtual object 30 based on the reference object 20 set according to a preconfigured category.

Specifically, when a predetermined virtual object is generated based on an authoring interface while the first reference object 21 is set according to a preconfigured category (for example, a 'floor, sidewall, ceiling, table' category), the production application may automatically generate the augmentation relationship attribute information between the generated virtual object and the reference object 20 based on the attribute information of the corresponding virtual object and the set first reference object 21.

As described above, the production application may generate augmentation relationship attribute information to display a virtual object generated in one virtual space on a different virtual space based on an association relationship between the virtual object and a reference object 20 selected among a plurality of objects within the virtual space, thereby allowing the virtual object to be displayed in its entirety without causing an augmentation error (for example, a case where part of a virtual object gets out of the display area of virtual space, and the virtual object is augmented on the virtual space while the part of the virtual object is cut off and/or a case where the virtual object is displayed overlapping another virtual object) even on a virtual space having different attributes.

Also, the production application according to the embodiment may store an authored virtual object by including generated augmentation relationship attribute information S109.

In other words, the production application according to the embodiment may store and manage a virtual object generated on the virtual object authoring space 10 based on the authoring interface by matching the virtual object to the augmentation relationship attribute information generated based on the corresponding virtual object and a predetermined reference object 20.

Figure 7:
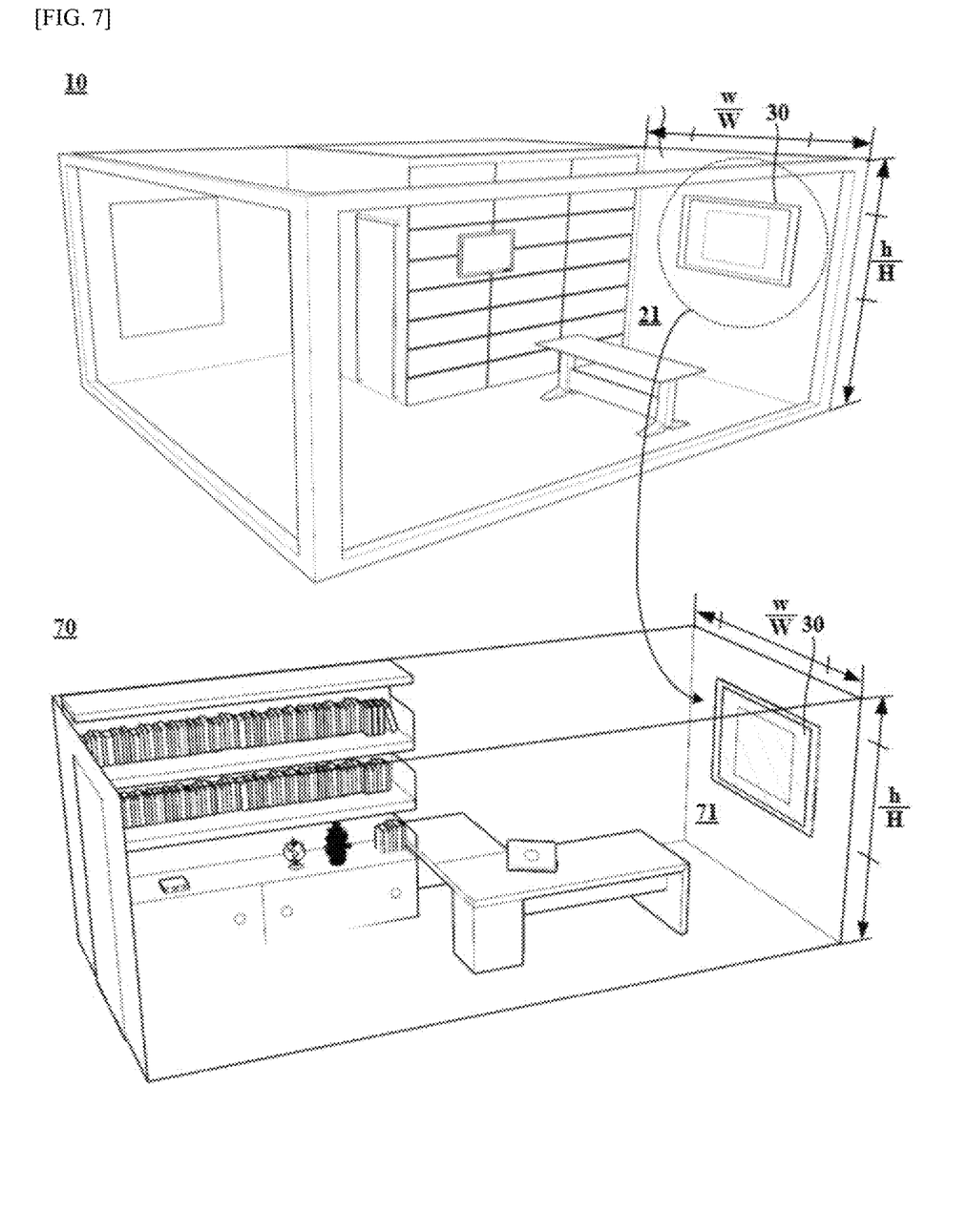
FIG. 7 is one example of displaying a predetermined virtual object on a different space other than a virtual object authoring space according to an embodiment of the present disclosure.

Also, the production application according to the embodiment may display a virtual object authored as described above in another virtual object authoring space 70 S111.

FIG. 7 is one example of displaying a predetermined virtual object on a different space 70 other than a virtual object authoring space according to an embodiment of the present disclosure.

Specifically, referring to FIG. 7, other than a first virtual object authoring space 10, which is a virtual authoring space that has generated a predetermined virtual object based on an input of a producer, the production application according to the embodiment may display the virtual object on a different space 70 that loads and displays a virtual object generated in the first virtual object authoring space 10.

At this time, according to the embodiment, a process for displaying a virtual object generated in the first virtual object authoring space 10 on the different space 70 may be performed based on the production application of a display terminal 102.

According to the embodiment, a first virtual object 30 generated in the first virtual object authoring space 10 by the production application of a producer terminal 101 may be loaded and displayed on the different space 70 implemented by the production application of the display terminal 102.

Alternatively, according to the embodiment, the first virtual object 30 generated in the first virtual object authoring space 10 by the production application of the producer terminal 101 may be loaded and displayed on the different space 70 implemented by the production application of the producer terminal 101.

More specifically, returning to the description, the production application may 1) display or recognize the different space 70.

At this time, the different space 70 may be a virtual space based on predetermined virtual object authoring software or tool or an actual space detected and recognized by at least one or more sensors (for example, an image sensor and/or a depth sensor) with respect to a surrounding environment of a user (in the embodiment, a producer or a user who loads and uses an authored virtual object).

Also, the production application according to the embodiment may 2) detect a reference object 20 within the displayed different space 70.

Specifically, based on the augmentation relationship attribute information of the first virtual object 30 to be displayed, the production application may check the first reference object 21 used as a reference when setting the attribute parameter information required to augment the first virtual object 30.

Also, based on the information on the category to which the checked first reference object 21 belongs, the production application according to the embodiment may detect a main reference object 71, which is an object corresponding to the category of the first reference object 21, among at least one or more objects within the different space 70.

For example, suppose the first reference object 21 is a 'sidewall object' 20-2 when the augmentation relationship attribute information of the first virtual object 30 is generated. Then, the production application may detect an object belonging to the sidewall object 20-2 category (in other words, a sidewall object within the different space 70) as the main reference object 71 among at least one or more objects within the different space 70.

Also, the production application according to the embodiment may display the first virtual object 30 on the different space 70 based on the 3) augmentation relationship attribute information between the detected reference object (in the embodiment, the main reference object 71) and the first virtual object 30 to be displayed.

Specifically, the production application according to the embodiment may augment and display, based on the attribute information of the main reference object 71, the first virtual object 30 on a predetermined area within the different space 70 that reflects the augmentation relationship attribute information of the first virtual object 30.

For example, when the main reference object 71 within the different space is the 'sidewall object' 20-2, and the first virtual object 30 to be displayed is a 'frame object,' the production application may augment and display the frame object on a predetermined area within the different space that reflects the augmentation relationship attribute information matched to the frame object based on the attribute information of the sidewall object 20-2.

Meanwhile, the production application according to another embodiment may display the first virtual object 30 at a predetermined position of the different space 70 (for example, the absolute position at which the first virtual object 30 has been authored in the first virtual object authoring space 10) while the augmentation relationship attribute information for the first virtual object 30 to be displayed on the different space 70 is not yet applied according to a user setting.

As described above, when a virtual object generated in one virtual space is displayed on a different virtual space, the production application displays the virtual object based on the attribute information matched to the virtual object and thus, displays the virtual object while minimizing an augmentation error (for example, the virtual object is loaded into a position outside the different virtual space, or the virtual object is displayed overlapping another virtual object within the different virtual space) or a sense of heterogeneity due to a relative attribute difference (for example, a difference between employed reference coordinate systems) between the virtual environments even when the corresponding virtual object is displayed on another virtual environment different from the virtual environment in which the virtual object has been generated.

As described above, the embodiments of the present disclosure described above may be implemented in the form of program commands which may be executed through various types of computer constituting elements and recorded in a computer-readable recording medium. The computer-readable recording medium may include program commands, data files, and data structures separately or in combination thereof. The program commands recorded in the medium may be those designed and configured specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be replaced with one or more software modules to perform the processes of the present disclosure, and vice versa.

Specific implementation of the present disclosure are embodiments, which does not limit the technical scope of the present disclosure in any way. For the clarity of the disclosure, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the specifications provided in the detailed descriptions of the present disclosure but has to be defined by the appended claims.

What is claimed is:

1. A method for augmented reality content production based on attribute information application by a production application executed by at least one or more processors of a computing device, the method comprising:
providing a first virtual object authoring space which is a virtual space for authoring a virtual object and includes at least one or more reference objects;
providing a virtual object authoring interface for the first virtual object authoring space;
generating the virtual object based on the provided virtual object authoring interface;
augmenting and displaying the virtual object in the first virtual object authoring space;
selecting a first reference object among the reference objects to set an augmentation relationship attribute information with respect to the virtual object;
generating the augmentation relationship attribute information between the virtual object and the first reference object based on an attribute information of the virtual object and an attribute information of the first reference object;
storing the virtual object by including the generated augmentation relationship attribute information; and
displaying the stored virtual object on a second virtual object authoring space other than the first virtual object authoring space based on the augmentation relationship attribute information,
wherein,
the displaying the stored virtual object in the second virtual object authoring space includes;
identifying the first reference object based on the augmentation relationship attribute information;
detecting a main reference object corresponding to the category of the first reference object, among at least one or more actual objects; and
displaying the virtual object on the second virtual object authoring space based on an attribute information of the main reference object and the generated augmentation relationship attribute information,
the providing a virtual object authoring interface for the first virtual object authoring space includes;
displaying a plurality of reference objects classified into different categories within the first virtual object authoring space for selection;
determining the first reference object for the virtual object according to a user's selection among the plurality of reference objects; and
providing a setting interface for moving, tilting, rotating, and scaling the virtual object according to a user's input,
the generating the augmentation relationship attribute information includes extracting at least one or more pieces of parameter information between the virtual object changed according to the setting interface and the first reference object and automatically setting augmentation relationship attribute information between the virtual object and the first reference object based on the extracted parameter information,
the displaying the stored virtual object on the second virtual object authoring space based on the augmentation relationship attribute information includes;
detecting an actual object corresponding to the first reference object within the second virtual object authoring space as the main reference object and augmenting and displaying the stored virtual object on the second virtual object authoring space with respect to the detected main reference object,
the augmentation relationship attribute information means attribute parameter information required for augmenting the virtual object based on the first reference object, and
the extracting at least one or more pieces of parameter information between the virtual object changed according to the setting interface and the first reference object includes extracting position relationship parameter information representing position information of the changed virtual object based on the position information of the first reference object.

2. The method of claim 1, wherein the providing a first virtual object authoring space includes generating the virtual object authoring space by detecting the 3D space for a user's surrounding environment based on at least one or more sensors.

3. The method of claim 2, wherein each of the reference objects is an actual object classified as a preconfigured reference object category among at least one or more actual objects within the first virtual object authoring space.

4. The method of claim 1, wherein the providing a virtual object authoring interface includes configuring attribute information for the virtual object, and the attribute information includes at least one or more of position information, pose information, scale information, and shape information for the virtual object.

5. The method of claim 1, wherein the extracting at least one or more pieces of parameter information between the virtual object changed according to the setting interface and the first reference object includes at least one or more of extracting pose relationship parameter information representing pose information of the changed virtual object based on the pose information of the first reference object, extracting scale relationship parameter information representing scale information of the changed virtual object based on the scale information of the first reference object, and extracting contact surface area information for the first reference object and the changed virtual object.

6. The method of claim 5, wherein the pose relationship parameter information is obtained by calculating a difference value between 6 degrees of freedom information of the first reference object and 6 degrees of freedom information of the virtual object.

7. The method of claim 1, wherein the position relationship parameter information is the height ratio information and/or width ratio information of the virtual object on the first reference object.

8. A system for augmented reality content production based on attribute information application, the system comprising:
at least one or more processors; and
at least one or more memories,
wherein
at least one application creates augmented reality content based on attribute information application stored in the memory and executed by the at least one or more processors, provides a first virtual object authoring space which is a virtual space for authoring a virtual object, wherein the first virtual object authoring space includes at least one or more reference objects;

configures at least one or more reference objects among actual objects within the first virtual object authoring space;

provides a virtual object authoring interface for the first virtual object authoring space;

generates the virtual object based on the provided virtual object authoring interface;

augments and displays the virtual object in the first virtual object authoring space;

selects a first reference object among the reference objects to set an augmentation relationship attribute information with respect to the virtual object;

generates the augmentation relationship attribute information between the virtual object and the first reference object based on an attribute information of the virtual object and an attribute information of the first reference object;

stores the virtual object by including the generated augmentation relationship attribute information; and displays the stored virtual object on a second virtual object authoring space other than the first virtual object authoring space based on the augmentation relationship attribute information, wherein the displaying the stored virtual object in the second virtual object authoring space includes;

identifying the first reference object based on the augmentation relationship attribute information;

detecting a main reference object corresponding to the category of the first reference object, among at least one or more actual objects; and displaying the virtual object on the second virtual object authoring space based on an attribute information of the main reference object and the generated augmentation relationship attribute information, wherein the at least one application, to provide a virtual object authoring interface for the first virtual object authoring space, displays a plurality of reference objects classified into different categories within the first virtual object authoring space for selection, determines the first reference object for the virtual object according to a user's selection among the plurality of reference objects, and provides a setting interface for moving, tilting, rotating, and scaling the virtual object according to a user's input;

to generate the augmentation relationship attribute information, extracts at least one or more pieces of parameter information between the virtual object changed according to the setting interface and the first reference object and automatically sets augmentation relationship attribute information between the virtual object and the first reference object based on the extracted parameter information; and to display the stored virtual object on the second virtual object authoring space based on the augmentation relationship attribute information, detects an actual object corresponding to the first reference object within the second virtual object authoring space as the main reference object and augments and displays the stored virtual object on the second virtual object authoring space as the main reference object with respect to the detected main reference object, wherein the augmentation relationship attribute information means attribute parameter information required for augmenting the virtual object based on the first reference object, and wherein the extracting at least one or more pieces of parameter information between the virtual object changed according to the setting interface and the first reference object includes extracting position relationship parameter information representing position information of the changed virtual object based on the position information of the first reference object.

9. The system of claim 8, wherein the application automatically sets the augmentation relationship attribute information by extracting at least two or more pieces of information among pose relationship parameter information representing pose information of the changed virtual object based on the pose information of the first reference object, scale relationship parameter information representing scale information of the changed virtual object based on the scale information of the first reference object, and contact surface area information for the first reference object and the changed virtual object.

10. The system of claim 9, wherein the pose relationship parameter information is obtained by calculating a difference value between 6 degrees of freedom information of the first reference object and 6 degrees of freedom information of the virtual object.

11. The system of claim 8, wherein the position relationship parameter information is the height ratio information and/or width ratio information of the virtual object on the first reference object.

* * * * *